United States Patent [19]
Jollyman

[11] 3,949,424
[45] Apr. 6, 1976

[54] GUIDE MEMBER FOR USE WITH A MAGNETIC HEAD OF A TICKET ISSUING MACHINE

[75] Inventor: Martin Frank Jollyman, Uxbridge, England

[73] Assignee: Bell Punch Company Limited, Uxbridge, England

[22] Filed: June 17, 1974

[21] Appl. No.: 480,262

[30] Foreign Application Priority Data
June 19, 1973 United Kingdom............... 28985/73

[52] U.S. Cl. ..................... 360/130; 360/128; 360/2
[51] Int. Cl.² ............... G11B 15/60; G11B 25/04; G11B 19/00
[58] Field of Search ......... 360/130, 128, 2, 88, 108, 360/102, 103, 109, 66; 340/149 A, 149; 235/61.11 D, 61.12 M, 61.11 A

[56] References Cited
UNITED STATES PATENTS

| | | |
|---|---|---|
| 2,897,288 | 7/1959 | Wijchman........................... 360/109 |
| 3,369,081 | 2/1968 | Atsumi................................ 360/66 |
| 3,439,126 | 4/1969 | Atsumi................................ 360/66 |
| 3,678,482 | 7/1972 | Billawala........................... 360/103 |

*Primary Examiner*—Alfred H. Eddleman
*Attorney, Agent, or Firm*—Laurence R. Brown

[57] ABSTRACT

A guide member for use with a magnetic reading and/or recording head of a ticket issuing machine is made of material of low permeability and has a portion of material of high permeability. When the guide member is located adjacent a magnetic read/record head and is adjusted so that the material of high permeability is in register with the gap of the head, the separation loss between the head and a ticket, coated with a magnetisable material and passing between the head and the guide, is reduced to a minimum.

5 Claims, 1 Drawing Figure

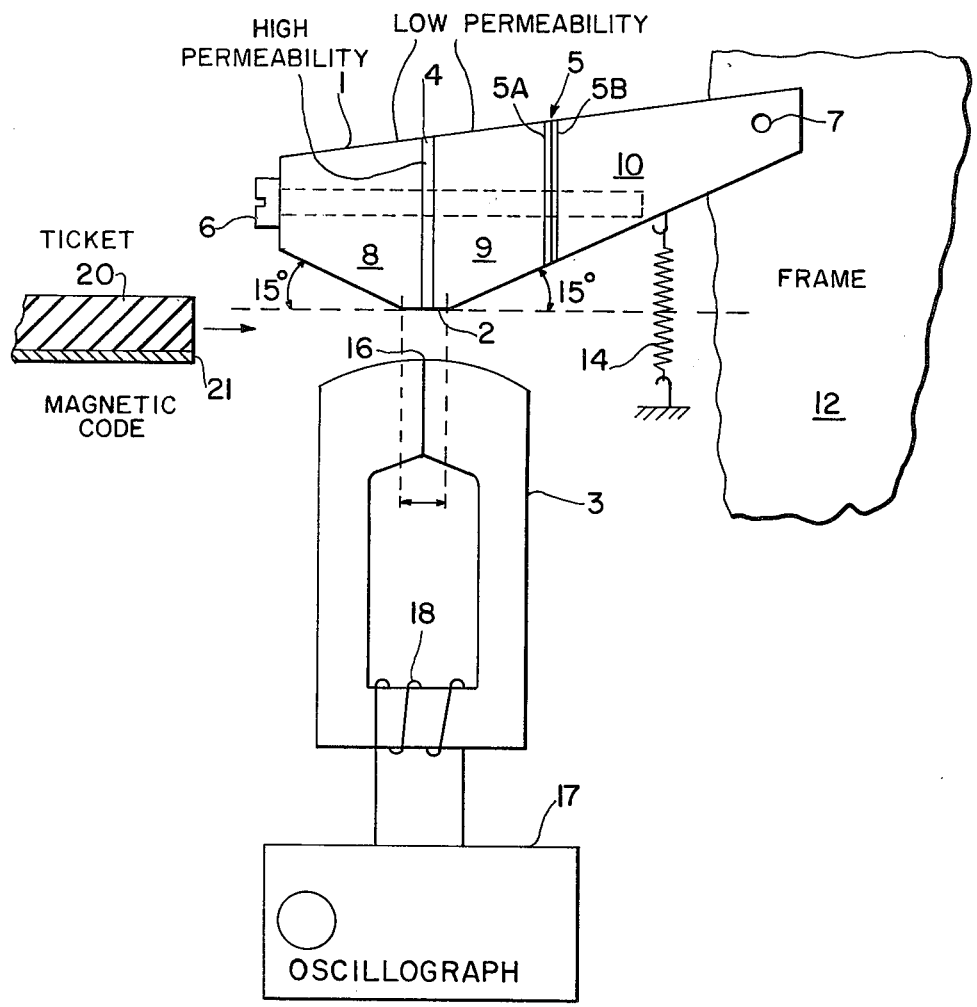

GUIDE MEMBER FOR USE WITH A MAGNETIC HEAD OF A TICKET ISSUING MACHINE

This relates to reading and/or recording means and, more particularly, to a guide member for use with a reading and/or recording head.

With an increasing use of magnetically encoded tickets for fare collection certain problems have arisen in attempting to separate signals from noise because consideration must be given to reading or recording on creased tickets. Since there is a relationship between a magnetising force and the distance from a magnet head of magnetic coating on a ticket passing over the head, the magnetising force will be different in the portion of a coating in a crease of the ticket owing to separation losses than for any other portion in the uncreased part of the ticket. Consequently, with creased tickets signals may not be recorded or may not be read if the noise to signal ratio is high owing to the separation loss.

Attempts have been made to iron out creases in tickets as they pass over a magnetic head by using a roller or slipper above the head, but these methods are not successful in removing deep creases.

Therefore, an object of the present invention is to provide an improved guide member for use with a reading and/or recording head.

According to the present invention there is provided a guide member for use with a reading and/or recording head, the guide member being made of material of low permeability and having a portion made of material of high permeability arranged so that when the guide member is adjacent the head the said portion is contained within an area of the guide member opposite an area bounded by a gap in the head.

An example of a guide member according to the present invention will now be described with reference to the accompanying drawing which is a diagrammatic representation.

The guide member comprises a slipper 1 made of brass and of generally inverted frusto-triangular shape. Each of the sloping sides of the member approach the flattened apex 2 at angles of 15° to the plane of the surface of the flattened apex. The area of the flattened apex is the same as that bounded by a head gap of a magnetic reading and/or recording head 3.

In the slipper 1 there is provided a shim 4 made of high permeability material, for example an alloy of nickel and brass and chromium, the bottom of the shim forming a central strip in the surface of the flattened apex 2. A second shim 5 is provided in the slipper 1, the shim 5 being formed by layers such as 5A and 5B which may be added to or which may have layers removed therefrom in order to adjust the thickness of the shim. The portions 4, 5, 8, 9 and 10 of the slipper 1 and shims 4 and 5 are secured together by means of a screw 6.

At the end of the slipper distant from the screw 6 there is an aperture 7 by means of which the slipper is pivotally mounted on a frame 12. Generally, resilient means 14 is provided for urging the slipper towards the head 3.

In use, the thickness of shim 5 is adjusted until the centre line of the shim 4 is vertically above the centre line of the gap 16 of the head 3. The adjustment is carried out with the aid of an oscilloscope 17 connected across the windings 18 of the head. When an oscilloscope is connected across the head 3, the magnetic noise created by an external magnetic field is recorded on the oscilloscope and the signal on the oscilloscope is reduced to zero when the shim 4 is vertically above the gap of the head 3.

In this manner, the slipper can be adjusted so that the shim 4, and therefore the centre line of the flattened apex 2, is directly above the centre line of the head gap of the magnetic head 3 and thus when a ticket 20 bearing a magnetic coating 21 passes over the magnetic head 3, the pressure of the slipper and its position relative to the head is such that the separation loss between the head and the ticket is reduced to a minimum. Thus, signals may be coded on the ticket or signals may be received from it relatively free from magnet noise whether or not the ticket is creased.

The sloping sides of the slipper 1 ensure that the slipper follows the contours of the creases of tickets 20 whether they move through the gap in a direction from left to right of the drawing or in the opposite direction.

What is claimed is:

1. A guide member for use with a reading and/or recording head having a magnetic gap therein to expedite reading of a ticket with a magnetic message thereon by said head, the guide member being made of material of low permeability and having an intermediate portion made of material of high permeability, means positioning the guide member adjacent the head so that the said intermediate portion is opposite said gap in the head, and means resiliently urging said head and guide member together for receiving said ticket adjacent said gap.

2. A guide member according to claim 1 comprising two plates of material of low permeability and a shim of material of high permeability secured between the plates.

3. A guide member according to claim 2 wherein the guide member defines a generally flat surface adjacent said shim and surfaces on either side of the shim sloping away from the flat surface containing the shim.

4. A guide member for use in processing magnetically coded tickets with a reading and/or recording head of the type presenting a gap, the guide member being made of material of low permeability and having an intermediate portion made of material of high permeability, and adjustable means positioning the guide member adjacent the head so that the said intermediate portion is opposite said gap in the head, the member comprising three plates of material of low permeability and two shims of material between the first and second of the plates and between the second and third of the plates respectively, one of the shims and retaining means therefor comprising said adjustable means to permit changes in thickness of said shims so as to adjust the position of the other of the shims relative to said gap in said head.

5. A guide member for use with a reading and/or recording head having a gap therein, the guide member being made of material of low permeability and having a thin shim portion made of material of high permeability, means for arranging the guide member adjacent the head with the said thin shim portion opposite said gap in the head and means resiliently urging said guide member and gap toward each other to receive therebetween a document having coded magnetic information thereon.

\* \* \* \* \*